8501X
J. Shaw.
Thrashing Mach.
Patented Nov. 19, 1834.
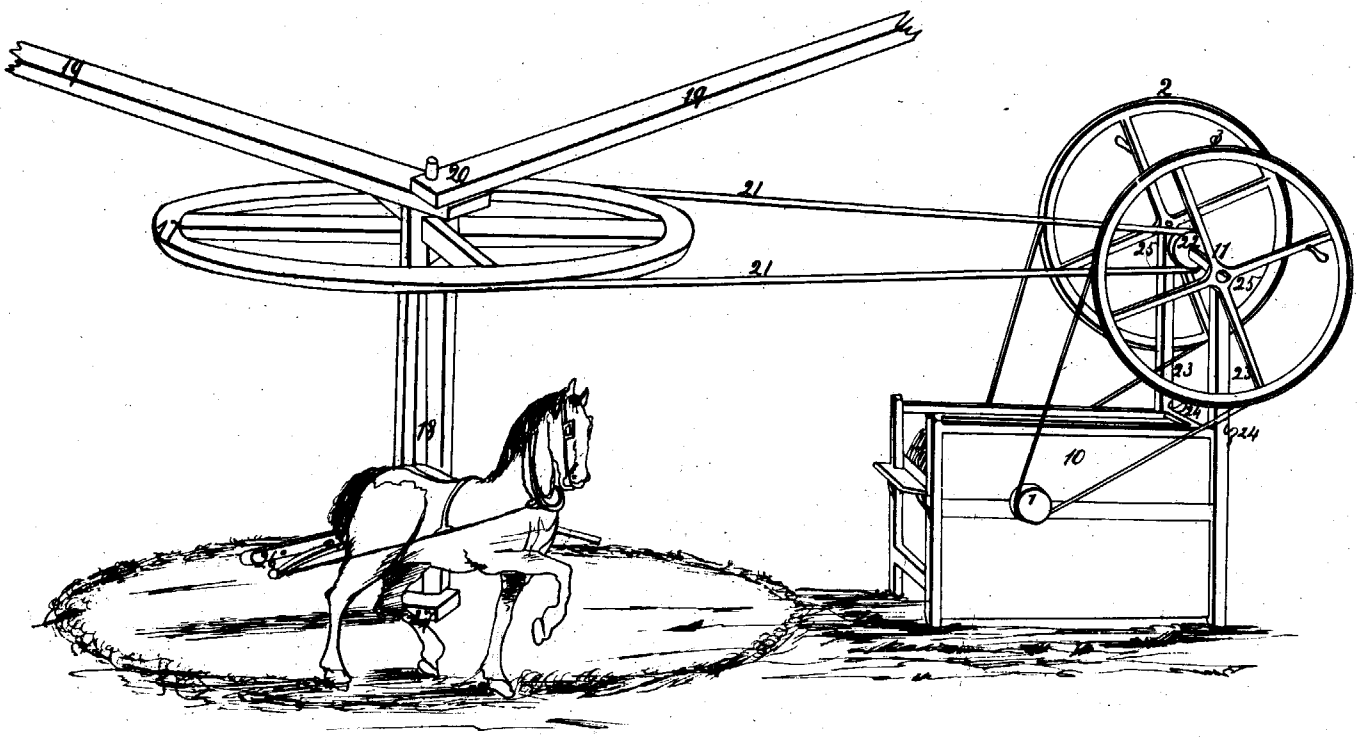

Nov 19. 1834 8501X

John Shaw of Augusta in the county of Kennebec & State of
Maine-

Letters Patent

The schedule referred to in these Letters Patent and making part
of the same, containing a description in the words of the said John
Shaw himself, of his improvement in a Machine for thrashing grain To all to whom these Presents shall come
Be it known, that I, John Shaw of Augusta, in the county of
Kennebec and state of Maine have invented a new and useful improve
ment in a Machine for thrashing grain, and the following is a clear,
full and exact description of said Machine as invented or improved by m The main body of the Machine is framed of strong joice- It is abou
three feet eight inches high and four feet six inches long- The sides are
boarded up and a joice side girt runs horizontally along the side from
one corner post to the other, sufficiently high up to permit the four revol
ving beaters herein after mentioned to revolve on a shaft resting thereo
without coming nearer than eight inches from the floor upon which the
machine stands- The Machine is about twenty inches wide between side
And both its sides are framed and constructed exactly alike and are
kept firmly together by two girts one of which on the front end is
placed within six inches of the foot of the posts, and the other is as
near the top of the posts at the other or back end of the Machine
Between the posts in the front end and directly above the side girts
above described, a thick board about two feet six inches wide, is
fitted to slide in so far as the thickness of the said front posts &
to let its inner edge come up flush with the concave receiver herein
after described, and for this purpose a square piece is cut out of
each end of said board so that it may slide between said post and
bring up flush against the front face of the front corner post- The
board inclines a little downward at its inner edge and is supported
in part by a rest directly underneath which is appended to each of
said front posts- The concave receiver is made of some solid hard w Drawn or material, and is hollowed out on its inner side like ninety degrees of
a cylinder about two feet in diameter - The ends of this concave receiver are
firmly confined to each side of the Machine, by means of the girts and side-
boards aforesaid, and the inner or hollowed surface of this concave receiver
is studded or set thickly but regularly, with square iron teeth, about three
inches long above the wood or surface of the receiver. These teeth are made
of iron bars about half an inch square, cut off bluntly, and sharpened at the
lower end so as to be driven into the receiver about 3 inches, and leave
the projecting part without alteration from the state of the Bar. This
receiver is so fixed or set in the machine, that the ends are snug to the sides
of Body and inclines downwards at its lower extremity sufficiently to
render its concavity concentric or nearly so with the shaft first men-
tioned on which the beaters revolve - The shaft referred to runs across
the body of the Machine from side to side, & revolves on boxes fitted to the
middle side girts aforesaid, & a small wheel (about nine inches in dia-
meter) is attached to each extremity of the said shaft and plays upon
the outside of the Machine. Within the body of the Machine and on
the middle of said shaft & firmly attached thereto, is a cross of joice, or
a strong frame work, locked together so as to present four arms of equal
length, at right angles with each other and radiating from the centre
of said shaft - These arms project about nine inches, and on the ex-
tremity of each is mortised or strongly fastened a piece of hard wood
joice about twenty inches long (corresponding with the width of the Ma
chine) and running parallel with the shaft, being confined at the mid
dle to the arm aforesaid and cut so that their ends will not rub again
the sides of the Machine - On the exterior face of the four pieces so
confined upon the extremity of the arms aforesaid, are set firmly one
row of iron teeth, blunt and square as above described, projecting
about three inches and extending along the whole length of each of the
pieces aforesaid which are parallel with the concave receiver and s
fitted that when they revolve with the shaft aforesaid, the teeth
thereof shall pass between the teeth set in the receiver, leaving abou
three sixteenths of an inch space between them, and also about the same space between the ends of the teeth revolving and the surface of the receiver — The two small wheels mentioned above, give motion to the arms and pieces at their extremities (called revolving beaters) being attached to the same shaft, & the grain enters by the feeding board passes into the concave receiver and is thrashed by the continued blows of the said revolving beaters & is thrown or conducted off by a conducting board which at one end is elevated about eight inches above the floor, touching the lower edge of the receiver & inclining downward to the feet of the back posts and constituting in fact the floor of the Machine — The four revolving beaters just described turn within an arched cap or covering of sheet iron or thin boards or other suitable material confined to the sides and in front terminating from three to five inches above the feeding board and extending about half a circle back — The small wheels aforesaid receive their motion from two large wheels (about six feet in diameter) placed in the same plane and connected thereto by bands playing over them respectively — These two large wheels are turned by hand power and handles are for that purpose appended to them — They are keyed on to opposite ends of the same shaft in such a manner that either or both of them may be removed at pleasure — They rest upon two arms which run out back of the main body of the Machine supported by braces and keyed on so that they may be also detached from the machine when desired —

The size of the Machine and of its Machinery may be varied having the different parts made to correspond with each other and the beaters may be made of iron or wood, or any solid material (A View of the Machine accompanies this specification —

What I claim as new and of my own invention are the revolving beaters, the shape and structure of the iron teeth, the manner of applying the hand power; and the cheap and compact method of constructing the feeding board and whole Machine —

John Shaw.

Witnesses { H. W. Fuller — Joel Savage — Kennebec Sept. 23.d 1834 —

Whereas I, John Shaw, of Augusta, in the county of Kennebec, and State of Maine have invented a new and useful improvement in a Machine for thrashing grain, and have heretofor given a particular description & specification of said Machine an subscribed and sworn to the same: Now therefore. Be it Known further, that I the said John Shaw, do hereby make the following addition to my former specification aforesaid, and ma the following description of a variation in the construction of said Machine, and of the additional machinery by which a horsepower may be applied thereto - A part of my said former specification of said Machine as invented by me, that is to say:-

The concave receiver, the revolving beaters, the wheels sha & pullies attached to the main body of the Machine and the whole interior thereof, is to be constructed as described particularly in my former specification: but the two back posts of the machine may be constructed about seven feet high and a nich or socket may be cut into the back faces of said Posts about four feet from their base, so that th shaft on the extremities of which are the two large wheels with handles, m easily revolve in said sockets and said large wheels be connected by C with the small wheels or pullies attached to the shaft upon which are t revolving beaters, as before described; and said wheels large & sma may be reduced nearly one half in size - The upper end of said bac posts are to be grooved or prepared with sockets into which the sha with the large wheels may be shifted and revolve therein, wheneve a horsepower is to be applied, which may be done as follows. On the middle of the last named shaft, a small wheel about four five inches in diameter, is confined so, that it will turn the said shaft with the large wheels by its revolutions - Over this last nam small wheel passes a band, above the front part of the machine a horizontal horsewheel, about seven feet in diameter, placed abo fifteen feet in front of the machine. Said horizontal wheel (bein sufficiently high up for a horse to travel under said band & inn the Crane herein after mentioned) is connected with and supporte on a perpendicular shaft seven or eight feet high, which revolve with
it, having gudgeons or pivots at each extremity, The upper end thereof
revolving in a place fitted for its reception in braces which are above
the horizontal wheel & attached to some distant object, and the lower
end turning in a block set in the ground for that purpose - From
the middle of this perpendicular shaft, a beam or arm extends out seven
or eight feet and at the extremity of this arm the horse is to be attached
and by means of the usual leading pole and rein may be made to
travel in a circle, under the wheel & braces last described. All
which is illustrated by the second drawing & explanation accom-
panying this additional specification, and which is to. considered
as connected with the former and made a part of this instrument
Hereby claiming as new & of my own invention all that I claimed
in my first specification, and also the manner of applying horse
power to the main Machine -

Witnesses -
H. W. Fuller Jr. }
H. W. Fuller }

Nov.r 3.d 1834 John Shaw

Drawing

Ex. [illegible]

192 4 108 [illegible]]